Oct. 18, 1949.                     C. G. SERIGHT                         2,485,171
                              ANTENNA CURRENT INDICATOR
                                  Filed Oct. 12, 1946
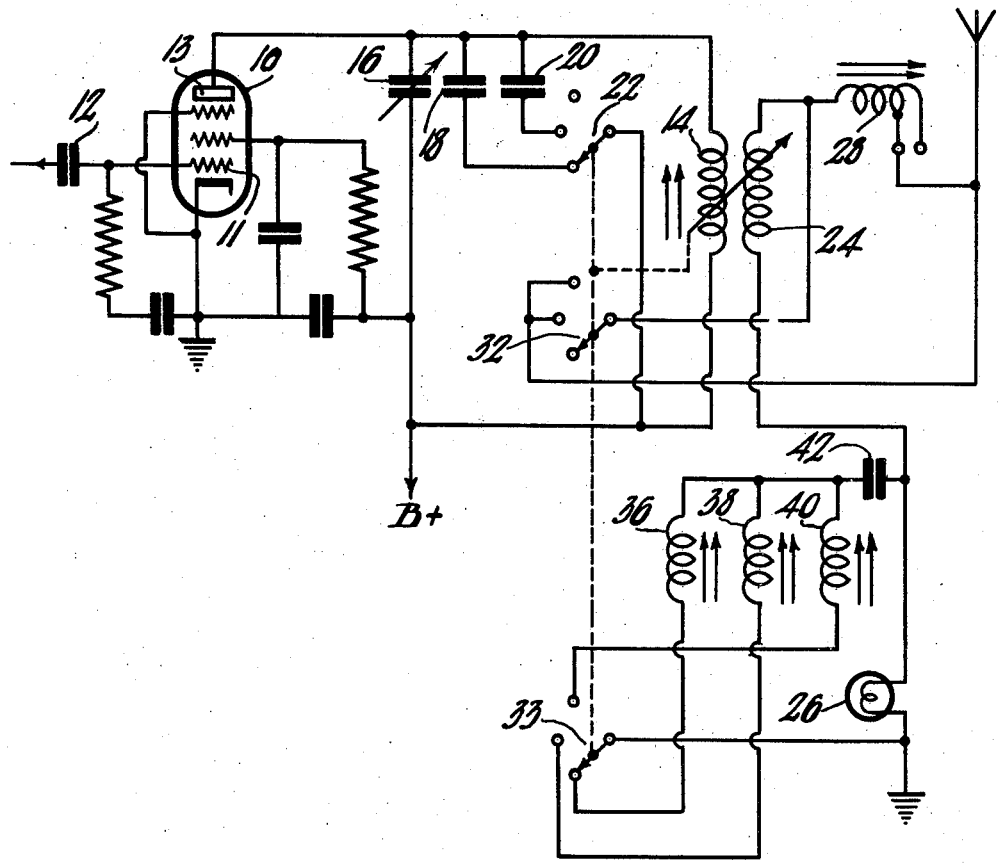
INVENTOR.
Carl G. Seright
BY
H. S. Grover
ATTORNEY Patented Oct. 18, 1949

2,485,171

UNITED STATES PATENT OFFICE 2,485,171

ANTENNA CURRENT INDICATOR

Carl G. Seright, Riverton, N. J., assignor to Radio Corporation of America, a corporation of Delaware Application October 12, 1946, Serial No. 703,056

5 Claims. (Cl. 250—17)

The present invention relates to radio transmitters and more particularly to indicating means for determining the current flow to the antennas associated with said transmitters.

An object of the present invention is to provide a simple antenna current indicator for aircraft or similar transmitters.

Another object of the present invention is the provision of an inexpensive rugged means for determining the proper loading of a transmitter by the antenna which may be connected to it.

A further object of the present invention is to provide a current indicator as aforesaid which includes selective means for adjusting the current sensitivity for the individual frequency band to which the transmitter may be tuned.

The foregoing objects and others which may appear from the following detailed description are attained by connecting in series between the antenna and the output circuit of the transmitter a low wattage filament type lamp with a selective inductive shunt arrangement whereby the sesitivity of the current indicator may be varied as the frequency band to which the transmitter is tuned is changed or as the transmitter is switched to different antennas.

The present invention will be more fully understood by reference to the following detailed description which is accompanied by a drawing in which reference numeral 10 indicates a vacuum tube serving as the power amplifier of a radio transmitter. High frequency energy from previous stages in the transmitter is coupled to the grid 11 of tube 10 through a coupling capacitor 12. To plate 13 of the power amplifier tube is coupled a tank circuit including variable inductance 14 and a tuning condenser 16.

In the present embodiment the output tank circuit is tuned within each operating band by varying the inductance of inductance 14 while the band selection is provided by switching in various fixed capacitors such as capacitors 18 and 20 by means of band switch 22. In variable inductive relationship with inductance 14 is a coupling link 24. One end of link 24 is connected to a radio frequency ground through a filamentary lamp 26 while the other end of link 24 is coupled to the antenna through a variable inductance 28 used for tuning the antenna to the operating frequency. Associated with band switch 22 and operated simultaneously therewith are further switches 32 and 33. Switch 32 is arranged to cut variable inductor 28 out of the circuit when not required while switch 33 is arranged to selectively insert inductances 36, 38 and 40 in series with condenser 42 and across indicator lamp 26. The shunt inductances 36, 38 and 40 in combination with capacitor 42 are primarily reactive in nature rather than resistive so that the resultant power loss in the shunt is low. The series capacitance 42 associated with the inductance offsets the inductive reactances of inductances 36, 38 and 40 to such an extent that the stray inductance in the switch wiring and associated connections does not neutralize the effect of the shunts. Thus each of the shunts may be tuned as near to series resonance as is necessary to obtain a proper current indication in indicator lamp 26 for each of the different operating bands or antenna conditions.

While I have shown only a single capacitive reactance element 42 in connection with inductances 36, 38 and 40, individual capacitors may be connected in series with each inductance element if desired to cover a wider range of frequencies, antenna characteristics or the like. By utilizing the present form of construction a separate shunt circuit may be provided for each band in which the transmitter is designed to be operated. The shunts are preferably so adjusted that a given amount of light given off by the antenna current indicator 26 indicates optimum operating characteristics as the output tank circuit is tuned through resonance or the antenna is most effectively coupled to the tank circuit.

While I have illustrated a particular embodiment of the present invention, it should be clearly understood that it is not limited thereto since many modifications may be made in the several elements employed and in their arrangement and it is therefore contemplated by the appended claims to cover any such modifications as fall within the spirit and scope of the invention.

What is claimed is:

1. In a radio transmitter a tunable output circuit, a load circuit, means for variably coupling said load circuit to said output circuit and means for determining that substantial power is being applied to said load circuit including a filament lamp connected in series in said coupling circuit and a shunt across said lamp for controlling the current flow through said lamp, said shunt including a series connected inductance and capacitance.

2. In a multi-band radio transmitter a tunable output circuit, a load circuit, means for variably coupling said load circuit to said output circuit, means for selectively switching circuit constants in said output circuit for operation in each of said bands and means for determining that power is being applied to said load circuit, including a filament lamp connected in series in said coupling circuit and a shunt across said lamp for controlling current flow through said lamp, said shunt including a series connected arrangement of a capacitance and selected one of a number of variable inductances, means for selectively switching said inductances into said shunt circuit simultaneously with the band switching of said output circuit.

3. In a multi-band radio transmitter a tunable output circuit, a load circuit, means for variably coupling said load circuit to said output circuit, means for selectively switching circuit constants in said output circuit for operation in each of said bands and a means for obtaining a qualitative determination of the power applied to said load circuit, including a current responsive device connected in series in said coupling circuit and a shunt across said device for controlling current flow therethrough, said shunt including a series connected arrangement of a capacitance and selected one of a number of variable inductances, means for selectively switching said inductances into said shunt circuit simultaneously with the band switching of said output circuit.

4. In a multi-band radio transmitter a tunable output circuit, a load circuit, means for variably coupling said load circuit to said output circuit, means for selectively switching circuit constants in said output circuit for operation in each of said bands and means for determining that power is being applied to said load circuit, including a filament lamp connected in series in said coupling circuit and a shunt across said lamp for controlling current flow through said lamp, said shunt including a series connected arrangement of a capacitance and selected one of a number of variable inductances, means for selectively switching said inductances, means for selectively switching said inductances into said shunt circuit simultaneously with the band switching of said output circuit, the inductances being individually so adjusted that the optimum power output of each band gives a proportional illumination of said lamp.

5. In a multi-band radio transmitter a tunable output circuit, a load circuit, means for variably coupling said load circuit to said output circuit, means for selectively switching circuit constants in said output circuit for operation in each of said bands and means for indicating the power applied to said load circuit, including a filament lamp connected in series in said coupling circuit and a shunt across said lamp for controlling current flow through said lamp, said shunt including a number of variable inductances, means for selectively switching said inductances into said shunt circuit simultaneously with the band switching of said output circuit, the inductances being individually so adjusted that the optimum power output in each band gives a proportional illumination of said lamp, and a capacitive means in said shunt circuit for neutralizing the effect of lead inductance in said shunt circuit.

CARL G. SERIGHT.

REFERENCES CITED

The following references are of record in the file of this patent:

UNITED STATES PATENTS

| Number | Name | Date |
|---|---|---|
| 1,323,155 | Clark | Nov. 25, 1919 |
| 1,515,990 | Bangay | Nov. 18, 1924 |
| 1,916,229 | Miller, Jr. | July 4, 1933 |

OTHER REFERENCES

The Radio Amateur's Handbook, "ARRL," 1945 edition, pp. 205, 259 and 260.